United States Patent
Kemmet Oster et al.

(10) Patent No.: US 9,110,317 B1
(45) Date of Patent: Aug. 18, 2015

(54) ADVANCED DRIVE CIRCUITRY FOR SAGNAC INTERFEROMETRIC SWITCH UTILIZING FARADAY ROTATION

(75) Inventors: Sasha N. Kemmet Oster, Chandler, AZ (US); Jin-Wei Tioh, Ames, IA (US); Mani Mina, Ames, IA (US); Robert J. Weber, Des Moines, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 695 days.

(21) Appl. No.: 13/440,355

(22) Filed: Apr. 5, 2012

(51) Int. Cl.
*G02F 1/095* (2006.01)
*G02F 1/313* (2006.01)

(52) U.S. Cl.
CPC ............ *G02F 1/0955* (2013.01); *G02F 1/3136* (2013.01)

(58) Field of Classification Search
CPC .................. G02F 1/095–1/0955; G02F 1/3136
See application file for complete search history.

(56) References Cited

U.S. PATENT DOCUMENTS

| 7,035,497 B2 | 4/2006 | Li et al. |
| 2011/0026869 A1 | 2/2011 | Kemmet et al. |

OTHER PUBLICATIONS

Jin-Wei Tioh et al.; "Field Coil for Magneto-Optic Switching: Capacitance Considerations", IEEE Transactions on Magnetics; Nov. 2008; 4 pages; vol. 44, No. 11.

Jin-Wei Tioh et al.; "Design of an Integrated Magneto-optic Switch for Transparent Networks"; Presented at: IEEE InterMag Conference, Sacramento, California; May 4-8, 2009; 4 pages.

Lilin Yi et al.; "A Polarization-Independent Subnanosecond 2×2 Multicast-Capable Optical Switch Using a Sagnac Interferometer"; IEEE Photonics Technology Letters; Apr. 15, 2008; 3 pages; vol. 20, No. 8.

Masahiko Jinno et al.; "Nonlinear Sagnac Interferometer Switch and Its Applications"; IEEE Journal of Quantum Electronics; Apr. 1992; 8 pages; vol. 28, No. 4.

Sasha Kemmet et al.; "Sagnac Interferometric Switch Utilizing Faraday Rotation"; Journal of Applied Physics 105, 07E702; 2009; 3 pages.

Sasha Kemmet et al.; "Fiber-based Magneto-optic Sagnac Optical Modulator"; paper; 2009; 4 pages.

Sasha Kemmet et al.; Magnetic Pulse Generation for High-Speed Magneto-Optic Switching; Journal of Applied Physics; Apr. 14, 2011; 7 pages; vol. 109, Issue 7.

Sasha Kemmet et al.; Current-Controlled, High-Speed Magneto-Optic Switching; IEEE Transactions on Magnetics; Jun. 2010; 3 pages; vol. 46, No. 6.

*Primary Examiner* — Jerry Rahll
(74) *Attorney, Agent, or Firm* — Reinhart Boerner Van Deuren P.C.

(57) ABSTRACT

A pre-pulsed magnetic field generation circuit for a fiber-based, magneto-optic (MO) optical modulator or switch for use in an interferometer is provided. The pre-pulsed magnetic field is used to control the amount of rotation in the state of polarization (SOP), and therefore, the ON-OFF extinction ratio. The circuit includes a pair of amplifier circuits that control the current through a coil to generate the pre-pulsed magnetic field. One amplifier controls a magnitude of a steady state portion of the magnetic field, while the other controls both the amplitude and duration of a pre-pulse portion of the magnetic field.

20 Claims, 10 Drawing Sheets

FIG. 15

ADVANCED DRIVE CIRCUITRY FOR SAGNAC INTERFEROMETRIC SWITCH UTILIZING FARADAY ROTATION

FIELD OF THE INVENTION

This invention generally relates to optical switches using a Sagnac interferometer, and more particularly to drive circuitry for fiber magneto-optic switches providing high speed, high bandwidth, all-optical switching with decreased optical rise time.

BACKGROUND OF THE INVENTION

As fiber-optic system research and use increase, there has been growing interest in developing fiber-based technology for switching, modulation, and system control. Magneto-optic (MO) fiber-based switches have been proposed and studied due to their low insertion loss, possibilities to be integrated into optical systems, large optical cross section (i.e. a majority of the fiber energy is captured by the MO), and the nonreciprocity of the induced polarization rotation due to the Faraday effect. Also, unlike electro-optic or MEMS which can have problems when switching high-power beams due to heat, magneto-optic can handle more power and maintain its switching integrity. These qualities also make MO materials attractive for use in optical modulators. In addition, recent fabrication and control advances of bismuth-substituted iron garnet single domain arrays, growth techniques, and optical circuit integration show promising results for use of magneto-optic materials in integrated high speed systems. In addition, optical switching with MO materials can be achieved with low operating voltages and is polarization independent.

In the non-magneto-optic realm, there has been work on optical modulators and switches using Sagnac and Mach-Zehnder interferometers. A Sagnac interferometer is a closed loop interferometer. The Sagnac interferometer was originally used by Georges Sagnac in 1913 to test for the existence of "luminiferous ether" via an effect now named the Sagnac effect. Though the interferometer is often associated with the Sagnac effect, it has many applications independent of its original application. With the development of optical fiber and fiber optic couplers, a new generation of Sagnac devices has been created, primarily as resonators, sensors, and gyroscopes.

Traditionally, switching time of magneto-optic switches has been slow, in the hundreds of microseconds range. However, with the availability of optics-grade orthoferrites, the switching time of magneto-optic devices can be greatly reduced. Additional improvements in switching speed can be obtained by using domain wall motion for the switching mechanism. In addition to advances in magneto-optic switching time, recent advances in fabrication of magneto-optic materials, growth techniques, optical circuit integration, and the experimental realization of magneto-optical photonic crystals show promising results for use of magneto-optic materials in integrated high speed systems.

Embodiments of the invention provide improved drive circuitry for an optical switch using the benefits provided by a Sagnac interferometer with the control of a magneto-optic device. These and other advantages of the invention, as well as additional inventive features, will be apparent from the description of the invention provided herein.

BRIEF SUMMARY OF THE INVENTION

Embodiments of the present invention provide advanced drive circuitry for magneto-optic (MO) fiber-based optical modulator (switch) which uses a Sagnac interferometer configuration. Embodiments of the modulator use a magneto-optic Faraday rotator (MOFR) and an external magnetic field to control the amount of interference at the output port of the modulator. Due to the Sagnac configuration, the difference in the rotation in the plane of polarization of the two waves is effectively doubled from a traditional MO modulator. Therefore, this configuration allows for a greater degree of modulation with application of small magnetic fields.

In one embodiment, the drive circuitry is for an optical switch utilizing a magneto-optic Faraday rotator (MOFR) and is capable of driving sub-microsecond switching. Preferably, the MOFR is a bismuth substituted iron garnet (BIG) material; although other embodiments may use other Faraday rotators know in the art. High optical switching speeds are accomplished through the design of electronic circuitry capable of creating high-speed magnetic pulses necessary to induce the Faraday effect. The strength of the magnetic field determines the output power at each output port of the switch. Optical rise times of approximately 195 ns are achieved for the optical circuit control.

In an embodiment of the present invention, a pre-pulsed magnetic circuit for generating a pre-pulsed magnetic field to control a switching time of an optical switch having a magneto-optic Faraday rotator (MOFR) interposed in a Sagnac loop is provided. The circuit includes a coil positioned to apply the pre-pulsed magnetic field to the MOFR. One terminal of the coil is configured to be coupled to an external power supply. The pre-pulsed magnetic circuit also includes a first amplifier circuit coupled to the second terminal of the coil. A second amplifier circuit is also coupled to the second terminal of the coil. In such a configuration, a magnetic field generating current that flows through the coil is the sum of a first current through the first amplifier circuit and a second current through the second amplifier circuit.

Preferably, the first amplifier circuit is configured to control an amplitude of a steady state portion of the pre-pulsed magnetic field. In one embodiment this first amplifier circuit includes a metal-oxide-semiconductor field-effect transistor (MOSFET) amplifier circuit having an input resistor divider circuit configured to receive a first input switching signal. The amplitude of the steady state portion of the pre-pulsed magnetic field in such an embodiment is a function of the gain of the MOSFET amplifier and an amplitude of the input switching signal.

The second amplifier circuit in one embodiment is configured to control an amplitude of a pre-pulse portion of the pre-pulsed magnetic field. Preferably, this second amplifier circuit includes a MOSFET amplifier circuit having an input configured to receive a second input switching signal. The amplitude of the pre-pulse portion of the pre-pulsed magnetic field is a function of the gain of the MOSFET amplifier and an amplitude of the second input switching signal. In some embodiments of the present invention, the second amplifier circuit is also configured to control the duration of the pre-pulse portion of the pre-pulsed magnetic field. Preferably, this MOSFET amplifier circuit has an input resistor capacitor circuit configured to receive the second input switching signal. The duration of the pre-pulse portion of the pre-pulsed magnetic field is a function of the time constant of the resistor capacitor circuit.

In another embodiment of the present invention, the pre-pulsed magnetic circuit includes a coil encircling the MOFR and a pair of MOSFET amplifier circuits coupled to the coil. Preferably, each of the MOSFET amplifier circuits are configured to control a different portion of a current flowing through the coil to generate a pre-pulsed magnetic field. In one embodiment, one of the pair of MOSFET amplifier circuits is configured to control an amplitude of a steady state portion of the pre-pulsed magnetic field. Preferably, the other one of the pair of MOSFET amplifier circuits is configured to control an amplitude of a pre-pulse portion of the pre-pulsed magnetic field. In a highly preferred embodiment, this one of the pair of MOSFET amplifier circuits is further configured to control a duration of the pre-pulse portion of the pre-pulsed magnetic field.

In an embodiment of the present invention, an optical switch is provided that includes a Sagnac interferometer having an input port and an output port coupled to a Sagnac loop through an optical coupler configured to split an incoming optical signal into two counter-propagating waves around the Sagnac loop, a magneto-optic Faraday rotator (MOFR) interposed in the Sagnac loop, and a pre-pulsed magnetic circuit associated with the MOFR. Modulation of the pre-pulsed magnetic circuit operates to turn the optical switch on and off. Preferably, the pre-pulsed magnetic circuit includes a coil and a pair of MOSFET amplifier circuits coupled to the coil. Each of the MOSFET amplifier circuits are configured to control a different portion of a current flowing through the coil to generate a pre-pulsed magnetic field.

In one embodiment of the optical switch, when the magnetic circuit generates a pre-pulsed magnetic field, constructive interference between the two counter-propagating waves occurs at the output port such that optical power is delivered to the output port. Preferably, the pre-pulsed magnetic circuit generates a first pre-pulsed magnetic field of a magnitude such that the MOFR is not saturated to turn the optical switch on. In one embodiment, the magnitude of a pre-pulsed portion of the pre-pulsed magnetic field is greater than a saturation magnitude of the MOFR. However, the duration of the pre-pulsed portion of the pre-pulsed magnetic field is less than a saturation time of the MOFR.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
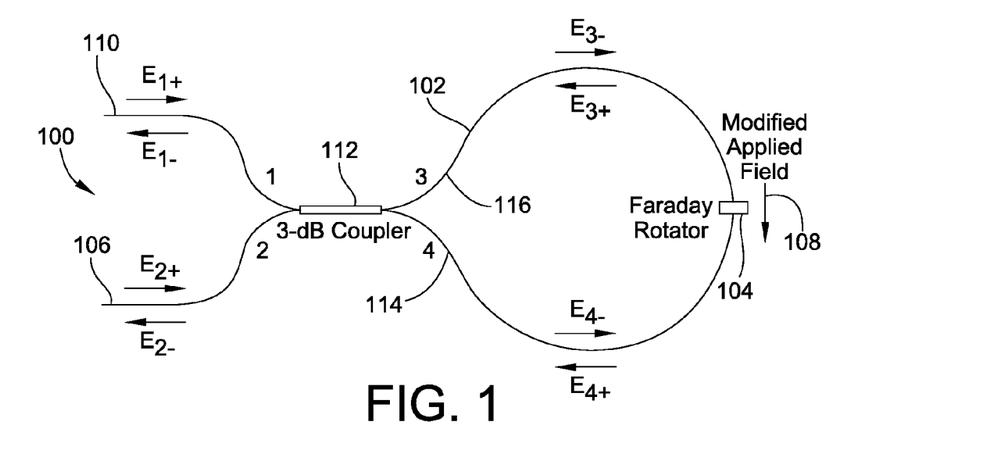
FIG. 1 is a simplified single line diagram of an embodiment of a Sagnac interferometric modulator (switch) utilizing Faraday rotation constructed in accordance with the teachings of the present invention.

As discussed briefly above, as demand for optical data and communication networks grow, there is an increasing need for high speed, high bandwidth, all-optical switching technologies. Magneto-optic based switches have low insertion loss and possibilities to be integrated into optical systems, and offer a promising way to create high speed switching in fiber systems. Other fiber, non-magneto-optic switches have also been proposed using Sagnac and Mach-Zehnder interferometers. As described in detail below, embodiments of the present invention provide control circuits to provide for such enhanced switching of magneto-optic switches 100 utilizing a Sagnac interferometer 102, such as the one which is illustrated in FIG. 1, or other interferometers, e.g. Mach-Zehnder, Michelson, etc. As such, reference to use with a Sagnac interferometer should be taken by way of example and not by way of limitation.

Before discussing the details of embodiments of such a control circuit, it is important to understand to functioning of this switch 100, which uses a magneto-optic Faraday rotator (MOFR) 104 to control the state of polarization in counter-propagating waves, which results in interference at the output port 106. A magnetic field 108 is used to control the amount of rotation in the state of polarization (SOP), and therefore, the ON-OFF extinction ratio.

Because the output of interferometers is significantly affected by all of the losses and reflections in the system, understanding and controlling various mismatches play a significant role in the device performance. As such, an analytical model is used to study the system. This analytical model includes the reflections at the magnetic-optical interfaces and predicts the phase shift and extinction ratio of an embodiment of the system of the present invention.

In the embodiment of the switch 100 utilizing a Sagnac interferometer 102 with a MOFR 104 in the loop as shown in FIG. 1, port 1 is treated as the input port 110 and port 2 as the output port 106. In this switch 100, a 3-dB coupler 112 is used to split the input signal into two counter-propagating waves that travel in opposite directions around the loop of the Sagnac interferometer 102. In other embodiments, the function of the coupler 112 may be performed by a power splitter device known in the art that is substantially lossless, and as such use of the term coupler herein should be taken to include power splitters as well. These waves are linearly polarized or a superposition of linear polarized components and approximately equal in amplitude. A $\pi/2$ phase shift is induced by the coupler 112 in the beam which passes from port 1 (input port 110) to port 4 (114) relative to the beam which passes from port 1 (input port 110) to port 3 (116). In the absence of any difference introduced between the two propagating beams, complete destructive interference will occur at port 2 (the output port 106) and the input power will be returned to the port 1 (input port 110).

In this embodiment of the switch 100, a bismuth substituted iron garnet Faraday rotator 104 [$(Bi_{1.1}Tb_{1.9})(Fe_{4.25}Ga_{0.75})O_{12}$] is placed in the loop and the bias magnetic field 108 through it is controlled by an external circuit. Due to the non-reciprocal nature of Faraday rotation, the polarization of the light traveling in opposite directions will undergo rotation approximately equal in amplitude but opposite in sign. The degree of rotation determines the amount of interference at the output port 106, and thus, an ON and OFF state can be achieved.

The switch 100 may either have a latching or non-latching configuration. In a latching configuration, a magnetic pulse needs to be large enough to saturate the magnetic material and the output will be delivered to port 2 (output port 106) until a large enough reverse field is supplied. In a non-latching setup, the signal is varied and controlled by an external applied field, as long as saturation is avoided.

As will be recognized by those skilled in the art, a simple Sagnac interferometer without a MOFR works by splitting an incoming wave (at the input port 1) into two counter-propagating waves. The output (at the output port 2) will vary based on the path difference introduced between the two counter-propagating waves. Ideally, when the path traveled by the two waves is identical, there is no output at port 2. The output at port 2 initially increases as the difference in the traveled paths increase and will undergo sinusoidal variations with the output reaching a maximum when the paths differ by integer multiples of the half-wavelength. At port 1, the output will be maximized when there is no path difference or they differ by integer multiples of the wavelength.

Returning again to FIG. 1, a linearly polarized incoming beam (designated $E_{1+}$) is split into two counter-propagating beams of equal magnitude, $E_{3-}$ and $E_{4-}$ by the 3-dB coupler 112. As used herein, a wave entering a port will be denoted with "+" and a wave leaving a port will be denoted with "−". As stated above, the phase difference introduced by the coupler 112 between the two beams is $\pi/2$. The action of the coupler 112 can be described using a Jones matrix as $$\begin{pmatrix} E_{3-} \\ E_{4-} \end{pmatrix} = \frac{1}{\sqrt{2}} \begin{pmatrix} 1 & j \\ j & 1 \end{pmatrix} \begin{pmatrix} E_{1+} \\ E_{2+} \end{pmatrix} \quad (1)$$

where $E_{1+}$ and $E_{2+}$ are the signals entering ports 1 (input port 110) and 2 (output port 106), respectively, and $E_{3-}$ and $E_{4-}$ are the signals exiting ports 3 (116) and 4 (114).

As discussed above, MOFR 104, which rotates the plane of polarization of a linearly polarized wave, is located within the loop of the Sagnac interferometer 102 as shown in FIG. 1, and its effect can be described with a Jones matrix as $$\begin{pmatrix} E_{4x+} \\ E_{4y+} \end{pmatrix} = Te^{-j\phi} \begin{pmatrix} \cos\theta & -\sin\theta \\ \sin\theta & \cos\theta \end{pmatrix} \begin{pmatrix} E_{3x-} \\ E_{3y-} \end{pmatrix} \quad (2)$$

where T is the transmission coefficient, $\theta$ is the angle of Faraday rotation experienced by the wave, $\phi$ is the phase shift introduced by the wave traveling the thickness of the MOFR 112, and $E_x$ and $E_y$ represent the x and y components of an incident beam, respectively. Due to the non-reciprocal nature of Faraday rotation, $\theta$ will not have the same sign for the two counter-propagating waves traveling through the Faraday rotator 104 relative to their direction of propagation. $\theta$ will be considered positive when the beam travels from port 3 (116) to port 4 (114) and negative when the wave is traveling from port 4 (114) to port 3 (116), so that Equation 2 should be modified for the counter-propagating wave as $$\begin{pmatrix} E_{3x+} \\ E_{3y+} \end{pmatrix} = Te^{-j\phi} \begin{pmatrix} \cos\theta & \sin\theta \\ -\sin\theta & \cos\theta \end{pmatrix} \begin{pmatrix} E_{4x-} \\ E_{4y-} \end{pmatrix} \quad (3)$$

Within the magnetically linear region, the amount of Faraday rotation is proportional to the strength of the magnetic field 108 applied to the MOFR 104. The response is considered linear while the applied magnetic field 108 is less than the saturation field and the beam passes through a sufficient number of domains. The rotation in this region is described by $$\theta_{FR} = \theta_{sat} \frac{H_{app}}{H_{sat}} \quad (4)$$

where $H_{app}$ is the applied magnetic field and $\theta_{sat}$ is the rotation of the plane of polarization at the saturation field $H_{sat}$. Assuming no input at port 2 (output port 106), the output at each port can then be written as a function of the applied field 108 as $$\begin{pmatrix} E_{1-} \\ E_{2-} \end{pmatrix} = Te^{j\phi} \begin{pmatrix} jE_{1x+}\cos\left(\frac{H_{app}}{H_{sat}}\theta_{sat}\right)\hat{x} + jE_{1y+}\cos\left(\frac{H_{app}}{H_{sat}}\theta_{sat}\right)\hat{y} \\ -E_{1y+}\sin\left(\frac{H_{app}}{H_{sat}}\theta_{sat}\right)\hat{x} + E_{1x+}\sin\left(\frac{H_{app}}{H_{sat}}\theta_{sat}\right)\hat{y} \end{pmatrix} \quad (5)$$

where $E_{1x+}$ is the x component of the incoming wave, $E_{1y+}$ is the y component of the incoming wave, $\phi$. is the phase change experienced by both waves due to length of the loop, and T is the transmission coefficient through the MOFR 112. This means that the output at port 2 (output port 106) can be approximated as linear with respect to $H_{app}$ while $\theta_{sat} \cdot (H_{app})/(H_{sat})$ is small. In this region the system can be utilized as an optical modulator, with the output optical power proportionally related to the applied magnetic field 108. For large values of $H_{app}$, the field will still be modulated; however, the output response will be non-linear with respect to the applied field. As expected, when the wave experiences no rotation (θ=0), the transmitted power is returned to the input port 110 with a π/2 phase shift. If there is a 90° rotation through the Faraday rotator 104 (θ=90° then the power is delivered to the output port 106 (port 2).

Using the Sagnac interferometer 102 for modulation offers a number of advantages. Since the interfering beams travel the same path (the Sagnac loop) there is no path length to match, unlike a Mach-Zehnder or Michelson interferometer, where matching path lengths between the two interferometric arms is required since nanometer differences in the path lengths cause deviations from the desired constructive or destructive interference. This Sagnac configuration offers high stability due to the short path length and inherently matched interferometric paths. This is particularly an advantage for being able to realize the modulator using fiber, where manufacturing differences between fibers can make it extremely difficult to create two paths of equal length. In addition, since both counter-propagating waves pass through a single MO material (Faraday rotator 104), the difference between the planes of polarization of the waves is 2θ, twice the difference achieved with a single MO material in other interferometric setups. This means that modulation can be achieved with lower magnetic fields, which in turn increases the achievable modulation frequency, and hence the switching speed achieved.

There are a number of factors which affect the modulator performance and speed which need to be considered in optimizing embodiments of the optical modulator of the present invention. Modulation speed is limited at the material level by the speed of domain wall motion. Traditonally, response time of magneto-optic materials has been slow (microseconds to hundreds of nanoseconds) as compared to electro-optic material's response time (subnanosecond). However, with the availability of optics-grade orthoferrites, the modulation time of this configuration, along with other magneto-optic devices, can be reduced and approach electro-optic response speeds.

At the control circuit level, the switching speed is limited by the speed at which the magnetic field can be changed through the MOFR 104. In one embodiment, the MOFR 104 is placed within a coil 118 with the geometry shown in FIGS. 2a and 2b, inserted between the two optical fibers that comprise the Sagnac loop. It is desirable to maintain a compact geometry, keep operating voltages low, and produce fast switching speeds.

Figure 2A:
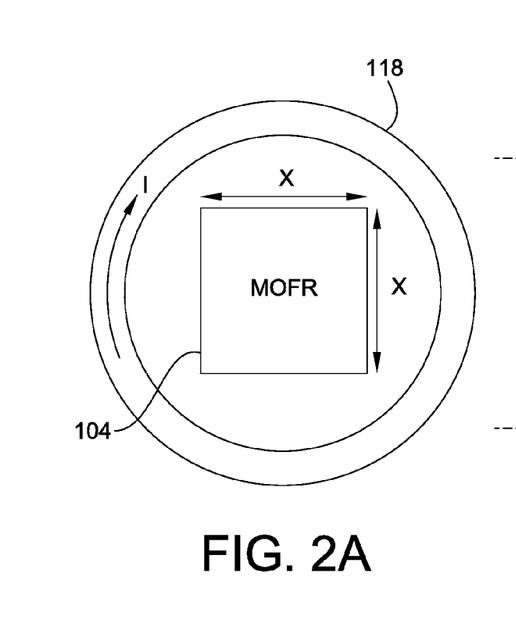
FIGS. 2a and 2b are a frontal and side view illustration, respectively, of a geometric configuration of a MOFR and coil arrangement illustrating aspects of an embodiment of a Sagnac interferometric modulator (switch)
Figure 2B:
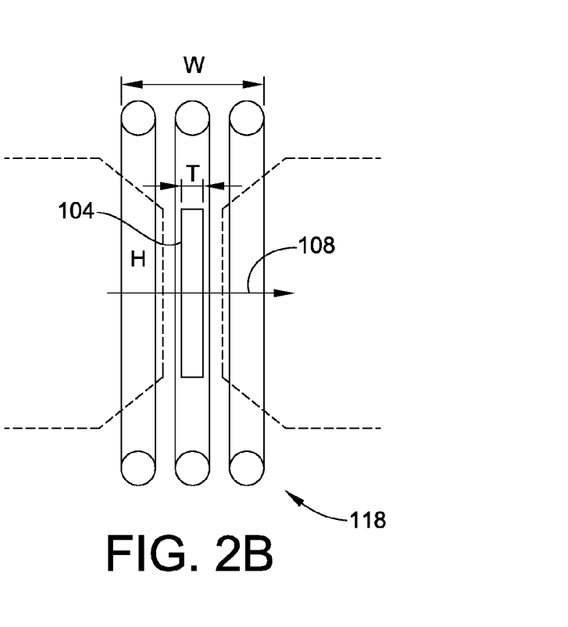

For a MOFR 104 with a thickness T within a coil 118 with width W as shown in FIG. 2b, while T<<W the magnetic field 108 in free space inside the solenoid coil 118 can be approximated as H=NI/W, where N is the number of turns in the coil 118 and I is the current in the coil 118. The volume magnetic field energy related to the input current is $$\frac{1}{2}LI^2 = \frac{1}{2} \int \int \int B \cdot H dv = \left(\frac{1}{2}\mu_r\mu_0 X^2 T + \frac{1}{2}\mu_0 X^2 (W - T)\right)|H|^2 \quad (6)$$

where L is the inductance of the coil 118, B is the magnetic flux density in free space in the solenoid coil 118, H is the magnetic field 108 in free space in the solenoid coil 118, $\mu_r$ is the relative permeability of the MOFR 108, v is the volume within the solenoid coil 118, and X is the linear dimension of the MOFR 108 as illustrated in FIG. 2a. From this, the inductance of the solenoid coil 118 can be found for T<<W $$L = \frac{\mu_0 X^2 HN}{I} \approx \frac{\mu_0 N^2 X^2}{W} \quad (7)$$

To drive the current in the solenoid coil 118, the voltage needed is $$V = L\frac{dI}{dt} = \mu_0 N X^2 \frac{dH}{dt} \quad (8)$$

The current needed to drive the magnetic field 108 is described by $$I \approx \frac{B}{\mu_0} W \quad (9)$$

There are a number of tradeoffs when considering the coil 118 design. A single turn coil would keep the required voltage low; however, it would require large amounts of energy to maintain the high current that would be necessary. In order to generate a given magnetic field 108, the number of turns is inversely related to the current required and linearly related to the necessary voltage. In an alternate embodiment switching can also be achieved by a combination of parallel and series turns, with the former for turn on and the later for maintaining the current. This is also a way to achieve a latching-type switch electronically without pushing the MOFR 104 into saturation.

There a number of factors which are important in evaluating an optical switch. Of these factors, the switching speed is the most important in determining the application and feasibility of a switch. The switching speed can be characterized by the rise time of the optical signal; the rise time is the time it takes from when a control signal is given to when the switch reaches 90% of the final optical output on the desired channel. Alternately, the rise time can also be defined as the time it takes for the signal to transition between 10% and 90% of its final value. The rise time is a function of the magnetic properties of the Faraday rotator and of the applied magnetic field. In the switch, this magnetic field was controlled by the electronic switching circuitry, shown as the modulation or magnetic pulse control circuit 120 in the figures.

The electronic control circuitry is critical to realizing magneto-optic switching and achieving fast switching speeds. The driving circuit takes an input pulse and generates a magnetic field that switches the optical signal between the two output channels. In the embodiments discussed below, the control circuits 120 are low duty cycle circuits, with the focus being primarily on increasing rise time In order to achieve a sufficiently large magnetic field 108 at reasonable voltages, a first embodiment of the modulation or magnetic pulse control circuit 120 shown in FIG. 3 was constructed with the MOFR 104 placed within the control coil 118, as illustrated in FIG. 2. Vp is a voltage pulse supplied by an external pulse generator 136. In order to avoid heating issues in the feasibility demonstration unit, the circuit 120 was driven at a low duty factor, although such would not be necessary in an embodiment with heat sinking adequate to address any heating issues. R3 138 is a small resistor used to measure the rise time of the current in the control coil 118.

The switching time is limited by the inductance of the control coil 118 and the switching speed of the transistor 140. In the embodiment of the circuit 120 illustrated in FIG. 3, the pulse generator 136 provides short pulses with a low duty factor to turn on transistor 140, which then allows current to flow through control coil 118 to generate the magnetic field. For an embodiment utilizing a non-latching configuration, the design of the control coil 118 has N turns in series with no turns in parallel.

Figure 4:
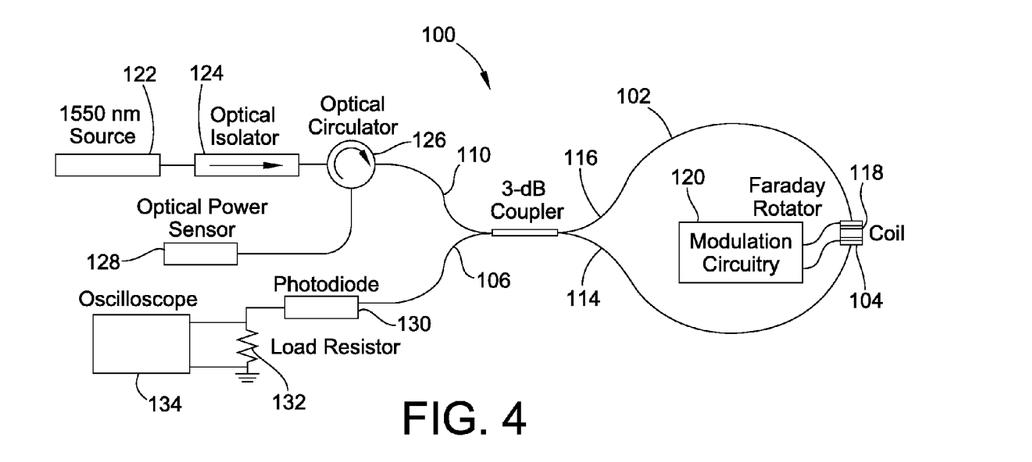
FIG. 4 is a simplified single line diagram of an experimental setup used to test an embodiment of the Sagnac modulator (switch)

As shown in FIG. 4, the magnetic field through the MO material of the Faraday Rotator 104 is created in one embodiment by the solenoid coil 118 which is driven by the external modulation circuit 120. On the circuit level, the modulation speed is limited by the L/R time constant associated with the inductance of the coil 118 with R being associated in part with the resistance of the transistor 140 (FET), the resistor 138, the series resistance of the capacitors C1 and C2, and the series resistance of the inductor 118. The spatial uniformity of the magnetic field also affects the modulation. Solenoid coil 118 design and optimization can help ensure uniformity and increase modulation or switching speeds. Insertion loss and reflections in the optical circuit can be reduced by using index-matching gel at the fiber-MO interfaces.

Because interferometry is based on interference, the operation of a Sagnac interferometer, as well as embodiments of the Sagnac switch 100 of the present invention, is greatly affected by reflections at the interfaces. In order to more appropriately model the switch's behavior, the reflection and transmission characteristics of the MOFR are considered. Assuming the reflection is polarization independent at the fiber-MO-fiber interface, the reflected portion of the wave at ports 3 (116) and 4 (114) is $$\begin{pmatrix} E_{R3+} \\ E_{R4+} \end{pmatrix} = \frac{1}{\sqrt{2}} \Gamma \begin{pmatrix} E_{1+} e^{-j2\phi_1} \\ jE_{2+} e^{-j2\phi_2} \end{pmatrix} \quad (10)$$

where $\Gamma$ is the reflection coefficient and $\phi_1$ and $\phi_2$ are the relative phases of the reflected wave at port 3 (116) and port 4 (114), respectively and are described by $\phi_1 = \beta_1 d_1$ and $\phi_2 = \beta_1 d_2$ where $d_1$ is the distance from port 3 (116) to the MOFR 104) and $d_2$ is the distance from port 4 (114) to the MOFR 104. The total output at port 2 (output port 106), including reflections at the interfaces, can be written as $$\begin{pmatrix} E_{2x-} \\ E_{2y-} \end{pmatrix} = \begin{pmatrix} -Te^{-j\phi}E_{1y+}\sin\theta + j\frac{1}{2}\Gamma E_{1x+}e^{-j2\phi_1} + j\frac{1}{2}\Gamma E_{1x+}e^{-j2\phi_2} \\ Te^{-j\phi}E_{1x+}\sin\theta + j\frac{1}{2}\Gamma E_{1y+}e^{-j2\phi_1} + j\frac{1}{2}\Gamma E_{1y+}e^{-j2\phi_2} \end{pmatrix} \quad (11)$$

where T is the transmission coefficient.

The refractive index of the MO at 1550 nm is 2.344 and approximately 1.5 for the fiber. The thickness of Faraday rotator 104 in one embodiment is 330 μm. In one embodiment, the MOFR 104 includes an index matching coating so that its index matches that of the fiber. Multiple MOFRs can be stacked within the coil 118 in order to reduce the magnetic field necessary to induce a rotation of 90° in the state of polarization. The total length of the loop is constant. It can be seen that the ON-OFF extinction ratio is affected by the fiber length. Specifically, when no field is applied through the MOFR 104 in order to achieve an OFF state, the reflections play a greater role in deteriorating the ON-OFF extinction ratio. Therefore, in order to experimentally improve the extinction ratio, in the non-latching condition the output at port 2 (output port 106) should be minimized with no field applied. The ON-OFF extinction ratio will be maximized with the MO in this position.

Returning again to the experimental setup shown in FIG. 4, a bismuth substituted iron garnet [$(Bi_{1.1}Tb_{1.9})(Fe_{4.25}Ga_{0.75})O_{12}$] is used as the MOFR 104 and the bias magnetic field through it is controlled by the external modulation circuit 120. In this embodiment the Faraday rotator 104 is 330 μm thick, has a refractive index of 2.344 at 1550 nm, and has an anti-reflection coating on both sides in order to match the index of refraction of the MOFR to that of the fiber. The input to the optical circuit (switch 100) was a 1550 nm laser 122 which was connected to a fiber optical isolator 124 to prevent reflection back into the source 122. A fiber optical circulator 126 was used to measure power reflected back to the input port 110 by an optical power sensor 128. The output of the second port (output port 106) was connected to a photodiode 130, which was placed in series with a load resistor 132. The output was measured using an oscilloscope 134. Throughout the circuit, single mode fiber was used and mode field strippers were placed along the length of each fiber to reduce the effect of higher order modes.

Figure 5:
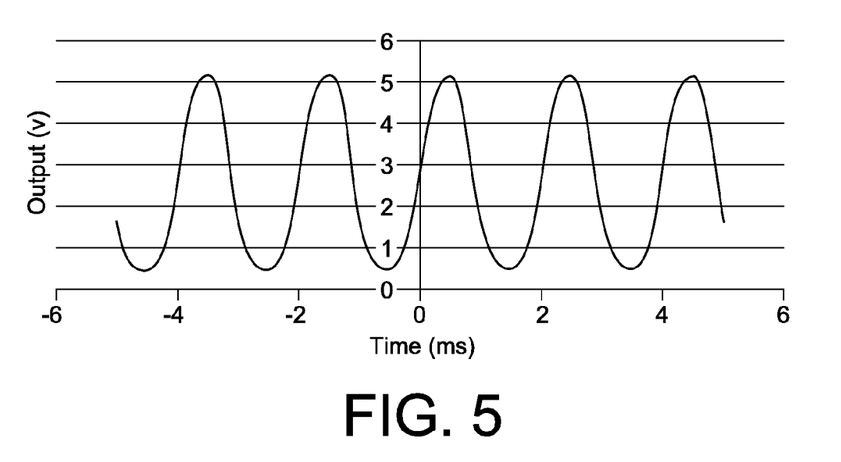
FIG. 5 illustrates experimental results from the setup of FIG. 4 of the output for a sine wave control signal.
Figure 6:
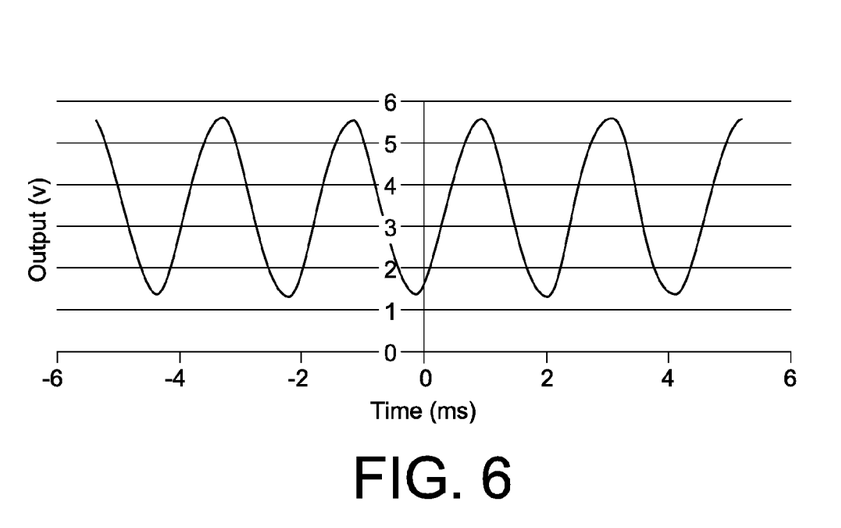
FIG. 6 illustrates experimental results from the setup of FIG. 4 of the output for a triangle wave control signal.
Figure 7:
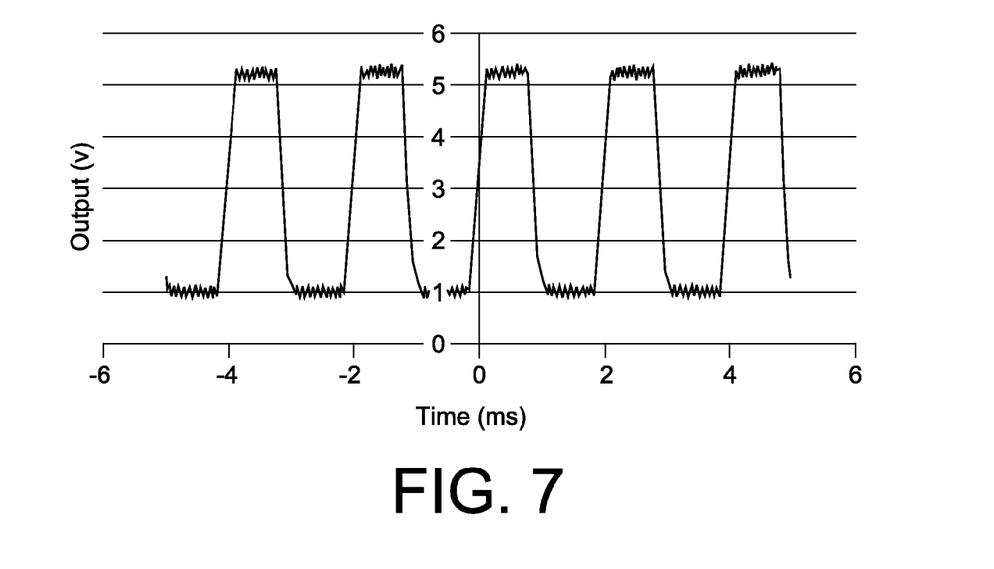
FIG. 7 illustrates experimental results from the setup of FIG. 4 of the output for a square wave control signal.

In one embodiment, the Faraday rotator 104 was placed in a coil 118 with a measured inductance of 1.118 mH at 1 kHz. For proof of concept, the control field was driven from 0 to 15 Oe at 500 Hz with different driving signals. The output for a sine, triangle, and square wave control signal is shown in FIGS. 5-7, respectively. The dynamic range for the sine, triangle, and square wave is 16.6 dB, 13.2 dB, and 13.5 dB, respectively. The dynamic range can be increased by applying a stronger magnetic field. However, this results in slower achievable modulation speeds.

There was some distortion in the current waveform used to generate the magnetic field due, in part, to the non-linearities in the transistor current driving circuit. Different circuit architectures can correct for this distortion. Additional non-linearities can arise from the amplitude dependence of the modulation field on the ferrite. This effect can be minimized by keeping the applied magnetic field small compared to the saturation field of the ferrite with the added benefit of avoiding hysteresis effects.

Figure 8:
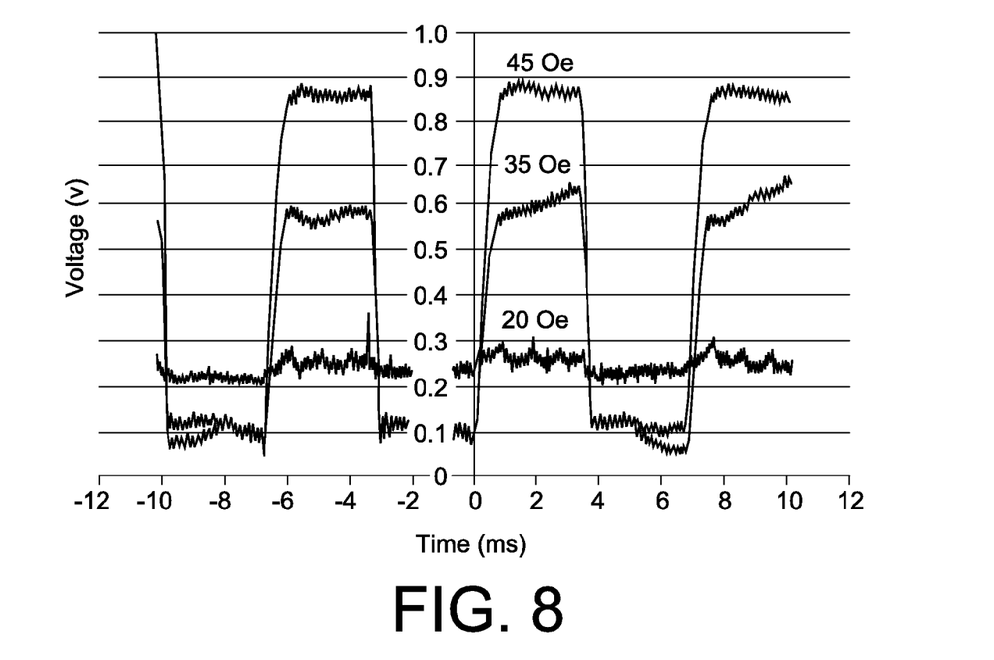
FIG. 8 illustrates experimental results of the output at port 2 of an embodiment of a Sagnac interferometric modulator (switch) utilizing Faraday rotation constructed in accordance with the teachings of the present invention utilizing single mode fiber (SMF) for different applied fields.

In an alternate embodiment, the magnetic field through the MOFR 104, controlled by the external circuit 120, is a square wave driven from 0 to 45 Oe at 150 Hz. In order to achieve the 90° rotation, two MOFR samples are used as the MOFR 104 in such an embodiment. The output power was detected with a photodetector connected to an oscilloscope similar to the experimental setup illustrated in FIG. 4. The experiment was carried out with both single mode fiber (SMF) and multimode fiber (MMF). In the case of the MMF, only the Sagnac loop was MMF. The output of the photodetector is shown in FIG. 8 for different fields applied to the MOFR 104.

As expected, when a magnetic field is applied, the power is increased at the output port 106. For SMF, there is a 15 dB ON-OFF extinction ratio with a 45 Oe field. The rotation $\theta_{FR}$ experienced by the beam is described by $\theta_{FR} = (H_{app}/H_{sat})\theta_{sat}$, where $H_{app}$ is the applied field, $H_{sat}$ is the saturation field, and $\theta_{sat}$ is the rotation at the saturation field. Therefore, as the magnetic field increases, the rotation increases and the extinction ratio improves. With MMF, the extinction ratio is 16 dB with an applied field of approximately 50 Oe.

Figure 3:
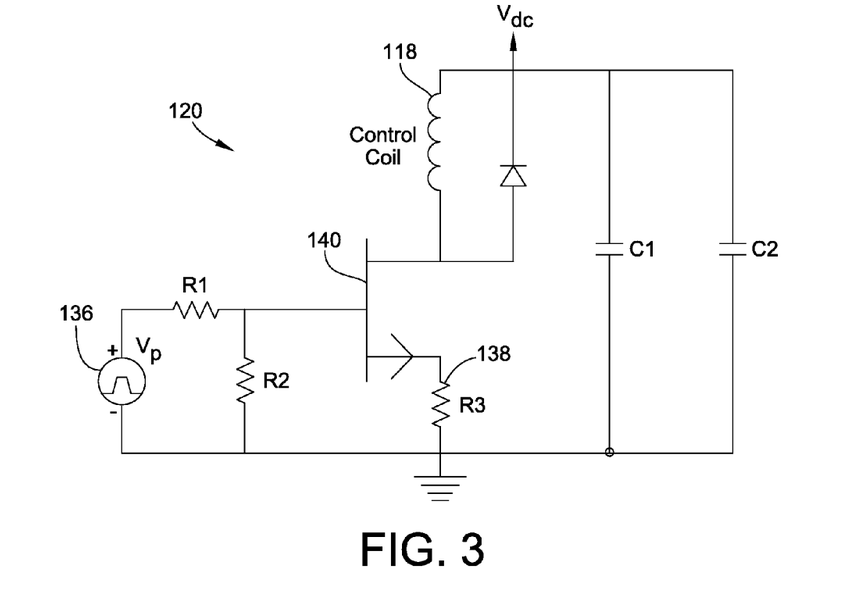
FIG. 3 is a simplified single line schematic diagram of a magnetic pulse control circuit usable in an embodiment of a Sagnac interferometric modulator (switch) utilizing Faraday rotation.

In an embodiment utilizing the modulation or magnetic pulse control circuit 120 of FIG. 3, the number of turns in control coil 118 was N=3, with Vdc=10 V and Vp=10 V. For measurement purposes, R3 was chosen to be 1.2Ω. The current through the coil 118 was approximately 3.5 A to achieve a field of 40 G within the solenoid. In order to keep the fibers aligned, the fibers and MOFR 104 are all within a modified optical connector, which the control coil is wrapped around. A transresistance amplifier was built to measure the response of the photodiode 130. The measurement of the switching time is limited by the photodiode rise time, the RC time constant associated with the measurement, and the switching speed of the transistor. Special attention must be paid to the capacitance of the photodiode and other parasitics of the measurement circuit at high speed. For the shown configuration, measurement of the optical response was limited to approximately 100 ns rise time.

Figure 9:
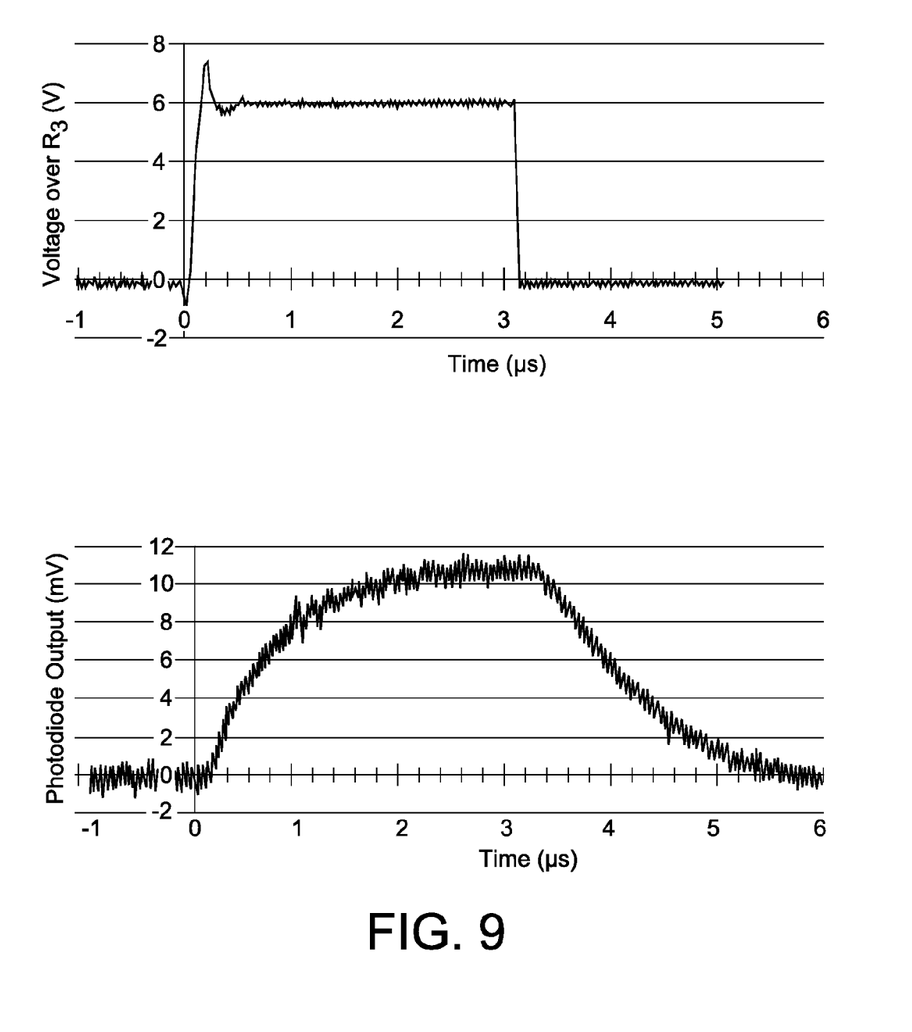
FIG. 9 illustrates experimental results of the measured magnetic pulse and the measured optical pulse of an embodiment of a Sagnac interferometric modulator (switch) utilizing the magnetic pulse control circuit of FIG. 3 to generate Faraday rotation constructed in accordance with the teachings of the present invention.

With these measurement limitations in mind, FIG. 9 shows the measured magnetic pulse and the measured optical switching response. The voltage measured over the R3 138 in the control circuit 120 indicates the rise time of the current in the coil 118 and therefore, of the magnetic field. The optical output was measured with the measurement circuit as discussed previously.

As shown, the rise time of the current in the solenoid coil 118 is approximately 75 ns. The rise time of the optical response is significantly slower; largely due to the domain wall velocity within the MOFR 104. The measured rise time is approximately 750 ns. Considerable switching time improvements are realized in alternate embodiments that do not utilize low operating voltage, but instead uses high voltage to increase switching time. Specialized coil design used in an alternate arrangement could also increase the switching time, as proposed in J. W. Tioh, M. Mina, and R. J. Weber, "Field coil for magneto-optic switching: Capacitance considerations," *IEEE Trans. Magn.*, vol. 44, pp. 3843-3846, 2008, the teachings and suggestions of which are incorporated herein in their entireties by reference thereto.

As discussed, the switching time of magneto-optic optical switches 100 is determined by how quickly the material can be magnetized in order to achieve the desired Faraday rotation of the optical signal. The embodiment discussed above focused on minimizing the rise time of the current in the magnetic-field generating coil 118; however, as it has been shown, the electronic rise time is approximately an order of magnitude faster than the optical rise time when using the single MOSFET amplifier as the driving circuit 120 shown in FIG. 3. Therefore, an alternate approach for minimizing the optical rise time is desired.

If the amplitude of the magnetic field applied to the MO material 104 is increased, the rise time of the optical signal should decrease; however, it is preferable to avoid saturating the MO material 104 and causing permanent pinning of the domains. In addition, applying a magnetic field that results in Faraday rotation greater than necessary degrades the performance of the switch 100.

In order to decrease the rise time in a preferred embodiment, the applied field was modified with a pre-pulse. That is, by using a pre-pulsed field the optical rise time could be improved while avoiding saturation of the material, even if the pre-pulsed field is greater than the saturation field. This is an important point. This allows the embodiment of the control circuit 120' (shown in FIG. 10 and discussed more fully below) to energize the domain walls to saturation velocities while avoiding pinning of the domains. In effect, the control circuit 120' applies a large field 108 (larger than the saturation field) to the MO material 104 for a long enough time period to move the domain walls, but not long enough to saturate the MO material 104. Once the domains had grown to achieve the necessary Faraday rotation, the field should be reduced to the field required to maintain the acquired magnetization of the MO material 104.

Figure 10:
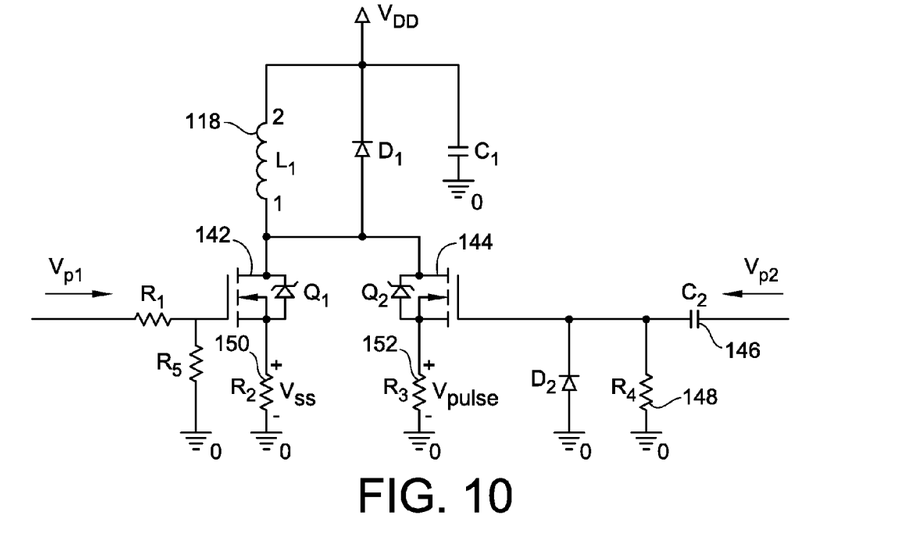
FIG. 10 is a simplified single line schematic diagram of an embodiment of a pre-pulsed magnetic field driving control circuit usable in an embodiment of a Sagnac interferometric modulator (switch) utilizing Faraday rotation constructed in accordance with the teachings of the present invention.

In the embodiment of such a control circuit 120' illustrated in FIG. 10, the control circuit 120' was designed to achieve a field in which the overshoot amplitude and duration and the maintaining field are controllable. The effect of a pre-pulsed magnetic field on the optical rise time was investigated by controlling the overshoot rise time, amplitude, and duration.

In order to observe the effect of overshoot on material magnetization, the control circuit 120' produces a field 108 perpendicular to the face of the material 104, in Faraday geometry with no in-plane field applied. As the field 108 is applied, favorably oriented domains (domains with their magnetic moments aligned with the applied filed) will grow at the expense of unfavorably oriented domains, causing the rotation experienced by the optical signal to increase until the material 104 is magnetized to its final value. The time which it takes to reach this value is determined by the domain wall velocity, which is well described for bismuth iron garnet. The domain wall velocity increases with the amplitude of the applied field 108 linearly until a saturation value is reached (as is known by those skilled in the art, there are in fact two linear regimes and a saturation regime). This means the domain wall velocity is greater at higher fields, until saturation, resulting in faster magnetization of the material 104. This is directly related to the time it takes to switch the optical output between ports. By initially overshooting the field necessary to achieve 90° rotation (switching from port 1 110 to port 2 106), the domain wall velocity can initially be higher, resulting in faster switching. Once the material 104 has become magnetized such that 90° Faraday rotation is achieved, the field 108 strength can be reduced to the field necessary to maintain the necessary state of magnetization (that which results in 90° Faraday rotation of the optical signal).

In order to achieve a pre-pulsed magnetic field through the MOFR 104, an embodiment of circuit 120' shown in FIG. 10 was designed. $L_1$ 118' is an N-turn coil in which the MOFR 104 is placed. The signal through the coil 118' is the sum of the signals through the amplifiers defined by $Q_1$ 142 and Q2 144. The amplitude of steady state field 108 is determined by the amplitude of $V_{p1}$ and the gain of the $Q_1$ 142 amplifier. The amplitude of the pre-pulse is determined by the amplitude of $V_{p2}$ and the gain of the $Q_2$ 144 amplifier. The duration of the pre-pulse is controlled by the time constant defined by $C_2$ 146, $R_4$ 148, and other resistive and capacitive loading associated with Q2 144.

The voltages over $R_2$ 150 and $R_3$ 152 can used to determine the current in the coil 118' and calculate the approximate magnetic field 108. The experimental setup shown in FIG. 4 was implemented with the driving circuit 120 being the circuit 120' shown in FIG. 10. A 15 turn coil with a length of 5 mm and diameter of 3.85 mm was used. The following values were chosen for the pre-pulse circuit: $V_{DD}$=18V, $R_1$=0Ω, $R_2$=$R_3$=1.2Ω, $R_4$=$R_5$=100Ω, and, $C_1$=10 μF. $V_{p1}$, $V_{p2}$, and $C_2$ were varied. The optical output at port 2 106 was measured with a photodiode 130 and a measurement circuit 134. The voltage was measured over $R_2$ 150 and $R_3$ 152 in order to approximate the magnetic field 108 in the coil 118'.

Figure 11:
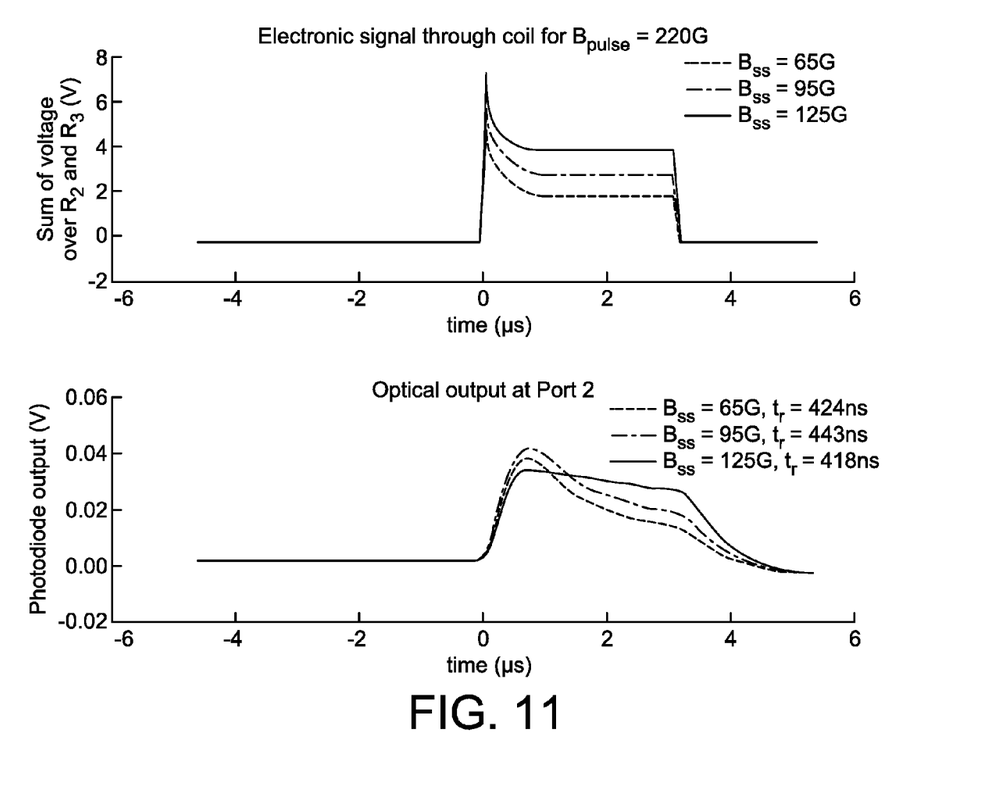
FIG. 11 illustrates experimental results for constant $B_{pulse}$=220 G for varying steady state field ($B_{ss}$) values; (a) shows the sum of the signals measured over $R_2$ and $R_3$ and (b) shows the optical signal as measured at the photodiode.

FIG. 11 shows the effect of varying the steady state magnetic field value while keeping the pre-pulse amplitude constant. The steady state magnetic field 108 can be varied by varying the amplitude of $V_{p1}$, which is provided by a function generator. The current and the magnetic field 108 in the coil 118' can be calculated from the sum of the voltages measured over $R_2$ 150 and $R_3$ 152. The values shown in the legend indicate the steady state values of the magnetic field 108. For these measurements, $C_2$ 146 was 12 μF and the overshoot duration was held constant. As expected, negligible change in rise time is observed since the MOFR 104 experiences the same initial field characteristics. The settling characteristics of the optical signal change, indicating that for the steady state magnetic field $B_{ss}$=65 G and $B_{ss}$=95 G, 90° degree rotation of the signal is not achieved with the applied steady state field.

Figure 12:
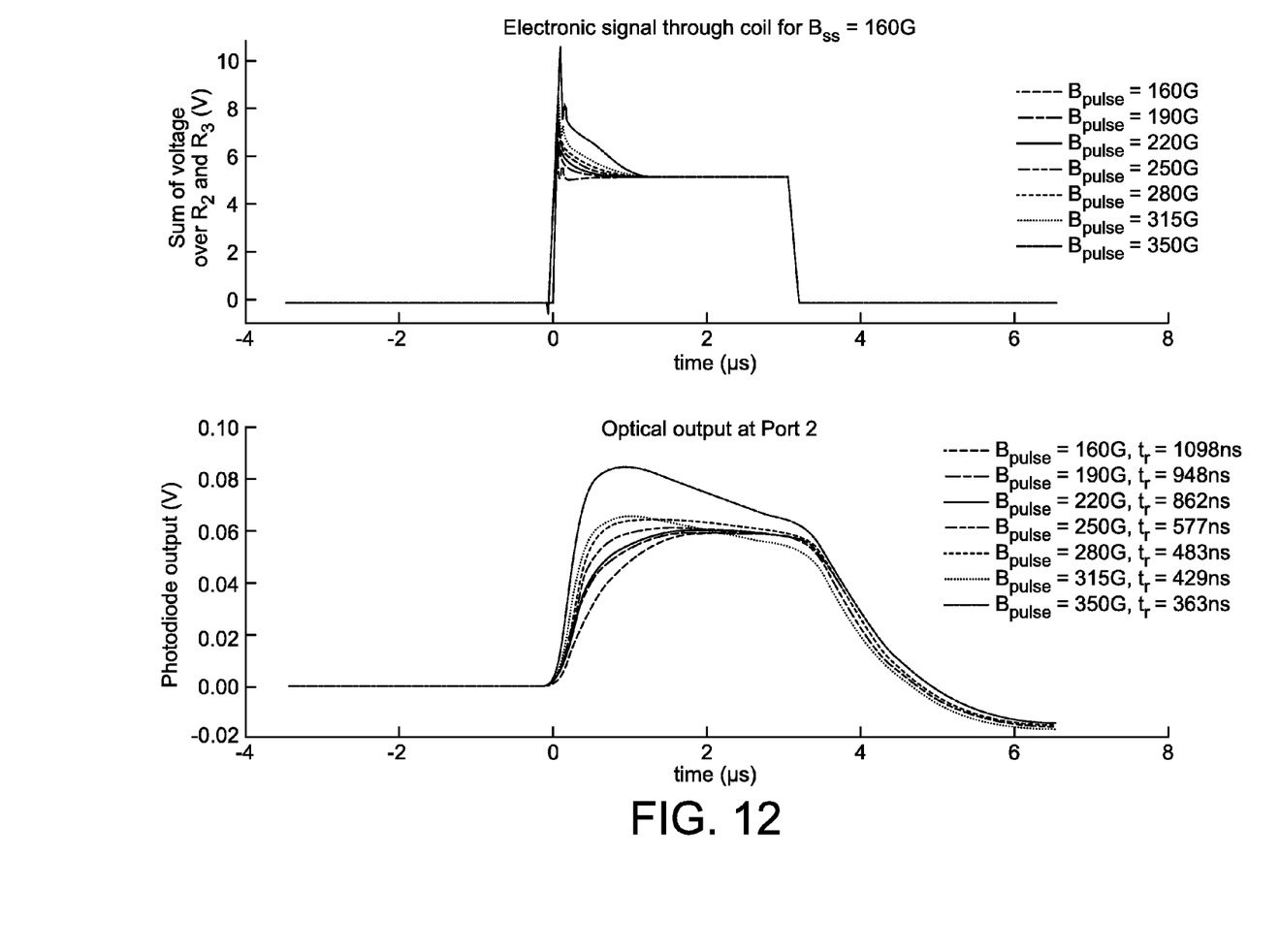
FIG. 12 illustrates experimental results for constant $B_{ss}$=160 G for varying peak field ($B_{pulse}$) values; (a) shows the sum of the signals measured over $R_2$ and $R_3$ and (b) shows the optical signal as measured at the photodiode.

In the next set of experiments, the steady state value was held constant as the overshoot amplitude was varied. It was expected that the greater the overshoot amplitude, the greater the initial domain wall velocity would be, resulting in faster optical switching speeds. Results for different magnetic pre-pulse max amplitude ($B_{pulse}$) are shown in FIG. 12 with the values for the steady state magnetic field value $B_{ss}$=160 G held constant. The first graph shows the sum of the signals over $R_2$ 150 and $R_3$ 152 and the second shows the corresponding optical response. The values shown in legend indicate the peak magnetic field value for the pre-pulsed part of the signal. As the amplitude of the pre-pulse increases, the rise time decreases. These results are summarized in Table 1, below.

TABLE 1

Optical rise time for different pre-pulse amplitudes

| $B_{pulse}$ (G) (calculated from voltage measurement) | Optical rise time (ns) (measured) |
|---|---|
| 160 G | 1098 ns |
| 190 G | 948 ns |
| 220 G | 862 ns |
| 250 G | 577 ns |
| 280 G | 483 ns |
| 315 G | 492 ns |
| 350 G | 363 ns |

It can be seen that by applying a pre-pulsed field, the optical rise time can be significantly decreased. An additional observation of significance is the amplitude of the overshoot field applied to the sample 104. The field 108 required to saturate a 1 mm×1 mm sample 104 is approximately 225 Oe, which corresponds to a magnetic flux density of 225 G in free space. This means that for the measurements shown, the applied field 108 was greater than the field required to saturate the material 104 for the cases where $B_{pulse}$ was greater than 225 G. However, the field 108 was applied for a short enough duration that the sample 104 did not saturate. If the sample 104 had saturated, the effects of some irreversible processes would have been observed; such as the material 104 remaining in the on state after the field 108 had been removed or not switching the next time a field 108 was applied. To test this, the duration of the overshoot was varied to see if such effects were observed.

Figure 13:
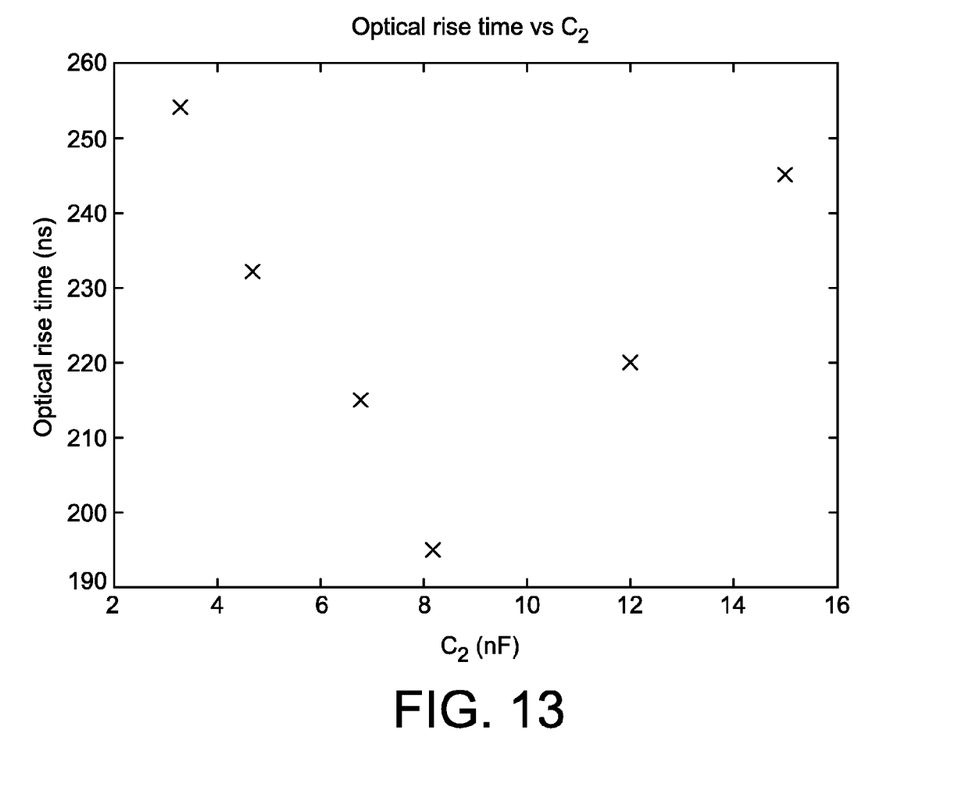
FIG. 13 illustrates experimental results for optical rise time as a function of $C_2$.

To vary the duration of the overshoot, the value of $C_2$ 146 was varied. Extreme care was taken not to disturb the experimental setup when the capacitor value was changed. $C_2$ 146 is associated with a time constant that determines the fall time from the overshoot signal to the steady state signal. Also associated with this time constant is the input impedance of the amplifier Q2 144. FIG. 13 shows a plot of measured optical rise time as a function of the value of $C_2$ 146. The larger the value of $C_2$ 146, the longer the fall time and the longer the duration of the overshoot field. The optical rise time decreases as the duration of the overshoot pulse increases, reaching a local minimum at $C_2$=8.2 nF in the embodiment illustrated.

Figure 14:
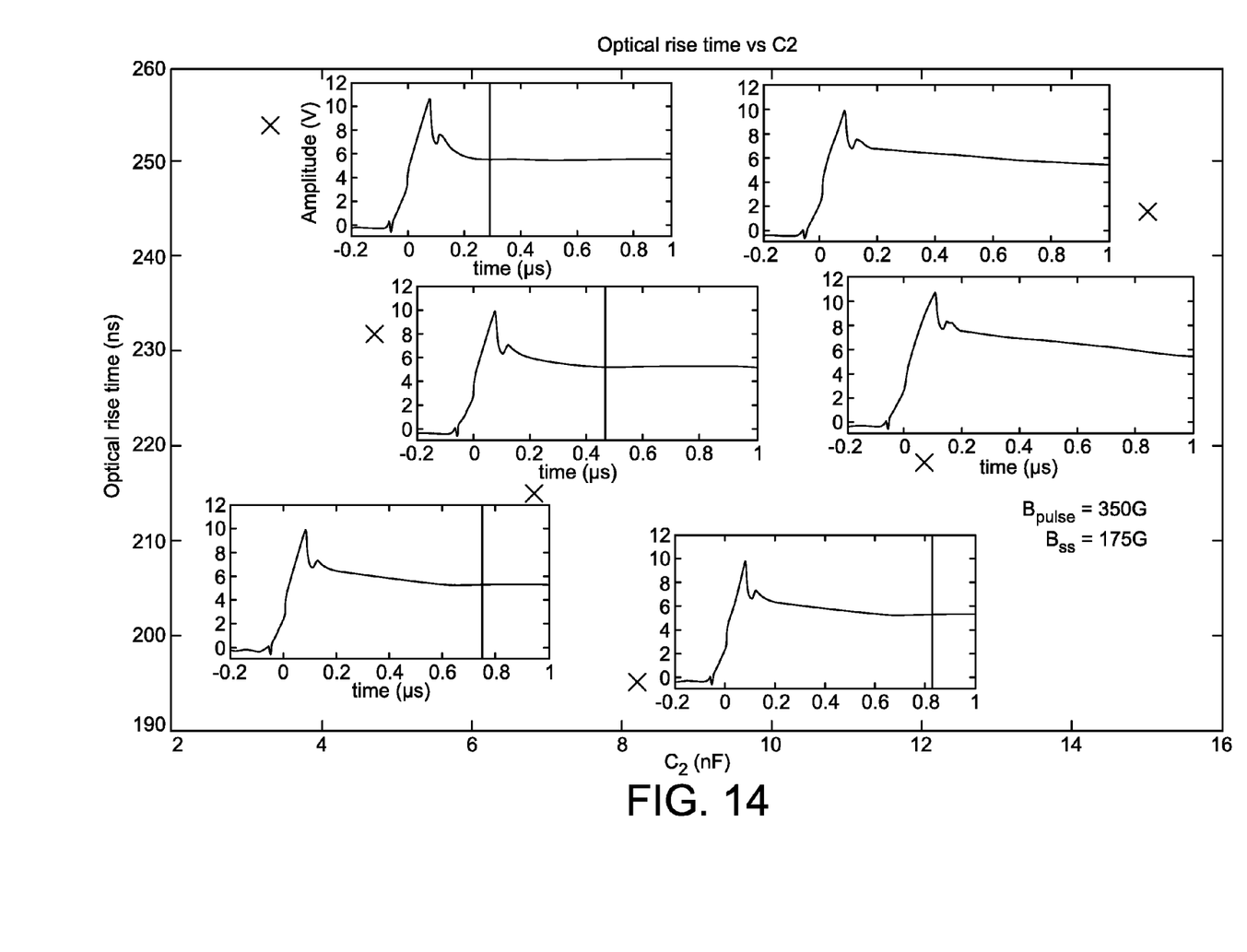
FIG. 14 illustrates the rise time as a function of $C_2$ as shown in FIG. 13 with electronic signals inset to shown settling time of electronic signal.

As $C_2$ 146 was increased to values greater than 8.2 nF, the rise time also increased. It was observed that if $C_2$ 146 was 20 nF or greater for pulse values near the saturation field, the output was extremely unstable, indicating the sample 104 may have been saturating. The fall time can be calculated as approximately $90C_2$ and the electronic signal associated with each capacitor value is shown as an inset in FIG. 14. The vertical line in each inset marks the approximate time at which the overshoot has settled to the steady state value.

Figure 15:
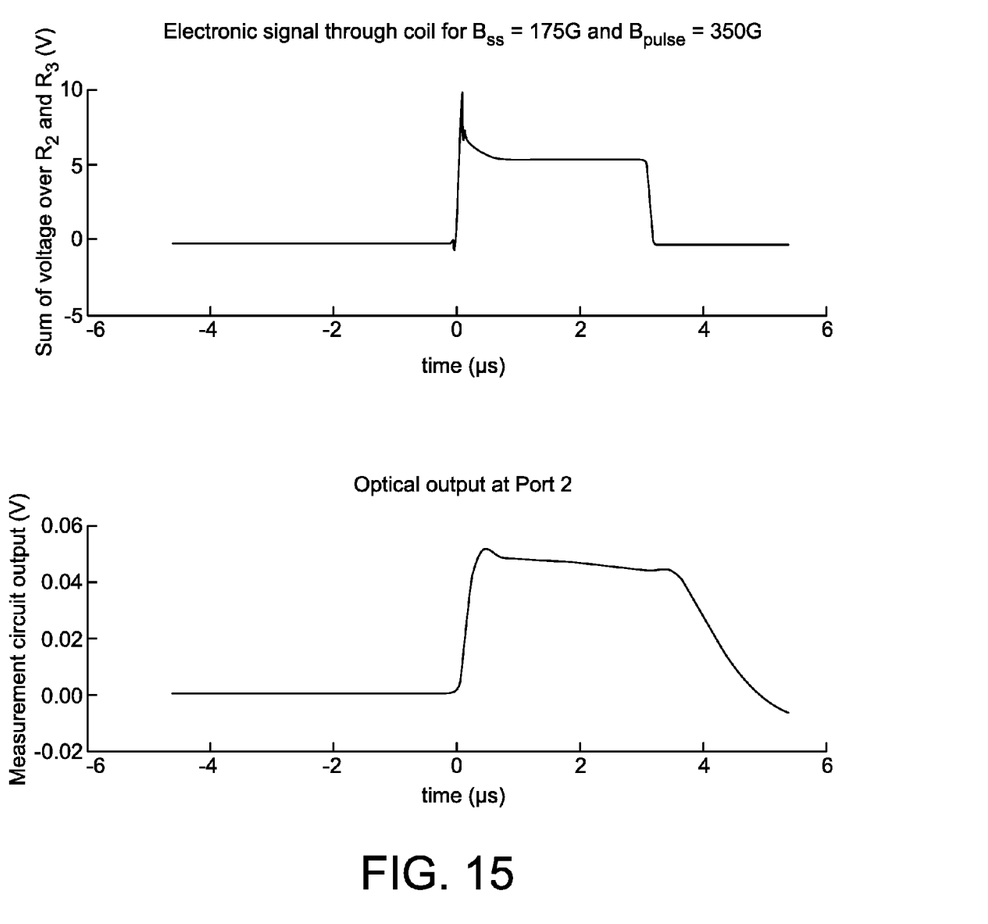
FIG. 15 illustrates experimental results demonstrating 200 ns switching; (a) shows the sum of the signals measured over $R_2$ and $R_3$ and (b) shows the optical signal as measured at the photodiode.

Finally, by combining the best cases from the different experiments with the pre-pulsed field, a rise time of 195 ns was achieved for $C_2$=8.2 nF, $B_{ss}$=175 G, and $B_{pulse}$=350 G. This result is shown in FIG. 15. In this way, rise time was decreased nearly an order of magnitude from the single MOSFET driving circuit 120 embodiment shown in FIG. 3 and nearly 4 orders of magnitude from a simple BJT driving circuit.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. For example, from the foregoing description those skilled in the art will recognize that optical rotators can be placed on port 1 and port 2 of the embodiment shown in FIG. 1 to achieve a 2×2 switching configuration. Moreover, any combination of the above-described elements in all possible variations thereof is encompassed by the invention unless otherwise indicated herein or otherwise clearly contradicted by context.

What is claimed is:

1. A pre-pulsed magnetic circuit for generating a pre-pulsed magnetic field to control a switching time of an optical switch having a magneto-optic Faraday rotator (MOFR), comprising:
   a coil positioned to apply the pre-pulsed magnetic field to the MOFR, the coil has a first terminal configured to be coupled to an external power supply, and a second terminal;

a first amplifier circuit coupled to the second terminal of the coil;

a second amplifier circuit coupled to the second terminal of the coil; and wherein a magnetic field generating current through the coil is the sum of a first current through the first amplifier circuit and a second current through the second amplifier circuit.

2. The pre-pulsed magnetic circuit of claim 1, wherein the first amplifier circuit is configured to control an amplitude of a steady state portion of the pre-pulsed magnetic field.

3. The pre-pulsed magnetic circuit of claim 2, wherein the first amplifier circuit includes a metal-oxide-semiconductor field-effect transistor (MOSFET) amplifier circuit having an input resistor divider circuit configured to receive a first input switching signal, the amplitude of the steady state portion of the pre-pulsed magnetic field being a function of a gain of the MOSFET amplifier and an amplitude of the first input switching signal.

4. The pre-pulsed magnetic circuit of claim 1, wherein the second amplifier circuit is configured to control an amplitude of a pre-pulse portion of the pre-pulsed magnetic field.

5. The pre-pulsed magnetic circuit of claim 4, wherein the second amplifier circuit includes a metal-oxide-semiconductor field-effect transistor (MOSFET) amplifier circuit having an input configured to receive a second input switching signal, the amplitude of the pre-pulse portion of the pre-pulsed magnetic field being a function of a gain of the MOSFET amplifier and an amplitude of the second input switching signal.

6. The pre-pulsed magnetic circuit of claim 4, wherein the second amplifier circuit is configured to control a duration of the pre-pulse portion of the pre-pulsed magnetic field.

7. The pre-pulsed magnetic circuit of claim 6, wherein the second amplifier includes a MOSFET amplifier circuit having an input resistor capacitor circuit configured to receive a second input switching signal, the input resistor capacitor circuit having a time constant, and wherein the duration of the pre-pulse portion of the pre-pulsed magnetic field being a function of the time constant of the resistor capacitor circuit.

8. The pre-pulsed magnetic circuit of claim 7, wherein the amplitude of the pre-pulse portion of the pre-pulsed magnetic field being a function of a gain of the MOSFET amplifier and an amplitude of the second input switching signal.

9. A pre-pulsed magnetic circuit for generating a pre-pulsed magnetic field to control a switching time of an optical switch having a magneto-optic Faraday rotator (MOFR), comprising:

a coil encircling the MOFR;

a pair of metal-oxide-semiconductor field-effect transistor (MOSFET) amplifier circuits coupled to the coil;

wherein each of the MOSFET amplifier circuits are configured to control a different portion of a current flowing through the coil to generate a pre-pulsed magnetic field.

10. The pre-pulsed magnetic circuit of claim 9, wherein one of the pair of MOSFET amplifier circuits is configured to control an amplitude of a steady state portion of the pre-pulsed magnetic field.

11. The pre-pulsed magnetic circuit of claim 10, wherein one of the pair of MOSFET amplifier circuits includes an input resistor divider circuit configured to receive a first input switching signal, the amplitude of the steady state portion of the pre-pulsed magnetic field being a function of a gain of the one of the pair of MOSFET amplifier circuits and an amplitude of the first input switching signal.

12. The pre-pulsed magnetic circuit of claim 9, wherein one of the pair of MOSFET amplifier circuits is configured to control an amplitude of a pre-pulse portion of the pre-pulsed magnetic field.

13. The pre-pulsed magnetic circuit of claim 12, wherein one of the pair of MOSFET amplifier circuits includes an input configured to receive a second input switching signal, the amplitude of the pre-pulse portion of the pre-pulsed magnetic field being a function of a gain of the one of the pair of MOSFET amplifier circuits and an amplitude of the second input switching signal.

14. The pre-pulsed magnetic circuit of claim 12, wherein the one of the pair of MOSFET amplifier circuits is further configured to control a duration of the pre-pulse portion of the pre-pulsed magnetic field.

15. The pre-pulsed magnetic circuit of claim 14, wherein the one of the pair of MOSFET amplifier circuits has an input resistor capacitor circuit configured to receive a second input switching signal, the input resistor capacitor circuit having a time constant, and wherein the duration of the pre-pulse portion of the pre-pulsed magnetic field being a function of the time constant of the resistor capacitor circuit.

16. The pre-pulsed magnetic circuit of claim 15, wherein the amplitude of the pre-pulse portion of the pre-pulsed magnetic field being a function of a gain of the one of the pair of MOSFET amplifier circuits and an amplitude of the second input switching signal.

17. An optical switch, comprising:

a Sagnac interferometer having an input port and an output port coupled to a Sagnac loop through an optical coupler configured to split an incoming optical signal into two counter-propagating waves around the Sagnac loop;

a magneto-optic Faraday rotator (MOFR) interposed in the Sagnac loop;

a pre-pulsed magnetic circuit associated with the MOFR; and wherein modulation of the pre-pulsed magnetic circuit operates to turn the optical switch on and off, the pre-pulsed magnetic circuit including a coil and a pair of metal-oxide-semiconductor field-effect transistor (MOSFET) amplifier circuits coupled to the coil; and wherein each of the MOSFET amplifier circuits are configured to control a different portion of a current flowing through the coil to generate a pre-pulsed magnetic field.

18. The optical switch of claim 17, wherein when the magnetic circuit generates a pre-pulsed magnetic field, constructive interference between the two counter-propagating waves occurs at the output port such that optical power is delivered to the output port.

19. The optical switch of claim 18, wherein the pre-pulsed magnetic circuit generates a first pre-pulsed magnetic field of a magnitude such that the MOFR is not saturated to turn the optical switch on.

20. The optical switch of claim 19, wherein the magnitude of a pre-pulsed portion of the pre-pulsed magnetic field is greater than a saturation magnitude of the MOFR, and wherein the duration of the pre-pulsed portion of the pre-pulsed magnetic field is less than a saturation time of the MOFR.

* * * * *